F. A. RUNDLE.

COMBINATION AUTOMATIC AND LOWERING BRAKE FOR HOISTING MACHINES.

APPLICATION FILED DEC. 16, 1921.

Reissued Mar. 7, 1922.

15,302.

2 SHEETS—SHEET 1.

Inventor

Fred A. Rundle

By Cheever & Cox

Attorneys

F. A. RUNDLE.

COMBINATION AUTOMATIC AND LOWERING BRAKE FOR HOISTING MACHINES.

APPLICATION FILED DEC. 16, 1921.

Reissued Mar. 7, 1922. 15,302.

2 SHEETS—SHEET 2.

Inventor

Fred A. Rundle

By Cheever & Cox

Attorneys

UNITED STATES PATENT OFFICE.

FRED A. RUNDLE, OF LOCKHART, FLORIDA, ASSIGNOR TO WHITING CORPORATION, OF HARVEY, ILLINOIS, A CORPORATION OF ILLINOIS.

COMBINATION AUTOMATIC AND LOWERING BRAKE FOR HOISTING MACHINES.

15,302. Specification of Reissued Letters Patent. Reissued Mar. 7, 1922.

Original No. 1,153,957, dated September 21, 1915, Serial No. 768,456, filed May 19, 1913. Application for reissue filed December 16, 1921. Serial No. 522,916.

*To all whom it may concern:*

Be it known that I, FRED A. RUNDLE, a citizen of the United States, formerly residing at Harvey, Illinois, now residing at Lockhart, in the county of Orange and State of Florida, have invented a certain new and useful Combination Automatic and Lowering Brake for Hoisting Machines, of which the following is a specification.

Where a hoisting machine, such as those employed for controlling the spout of ore docks is used, it is very important that they shall automatically lock against any tendency of the load to descend, but shall be under the full control of an operator when it is desired to actually lower the load.

The invention relates to hoisting devices of this class, and its object is to control the hoisting mechanism.

The invention consists in a combination of braking devices, one automatic, the other manually operated, the former being released as the latter is brought into use.

More in detail, the invention consists in the use of band brakes combined in the manner described and still more in detail in the specific features hereafter set forth in the specification and the claims.

Figure 1:
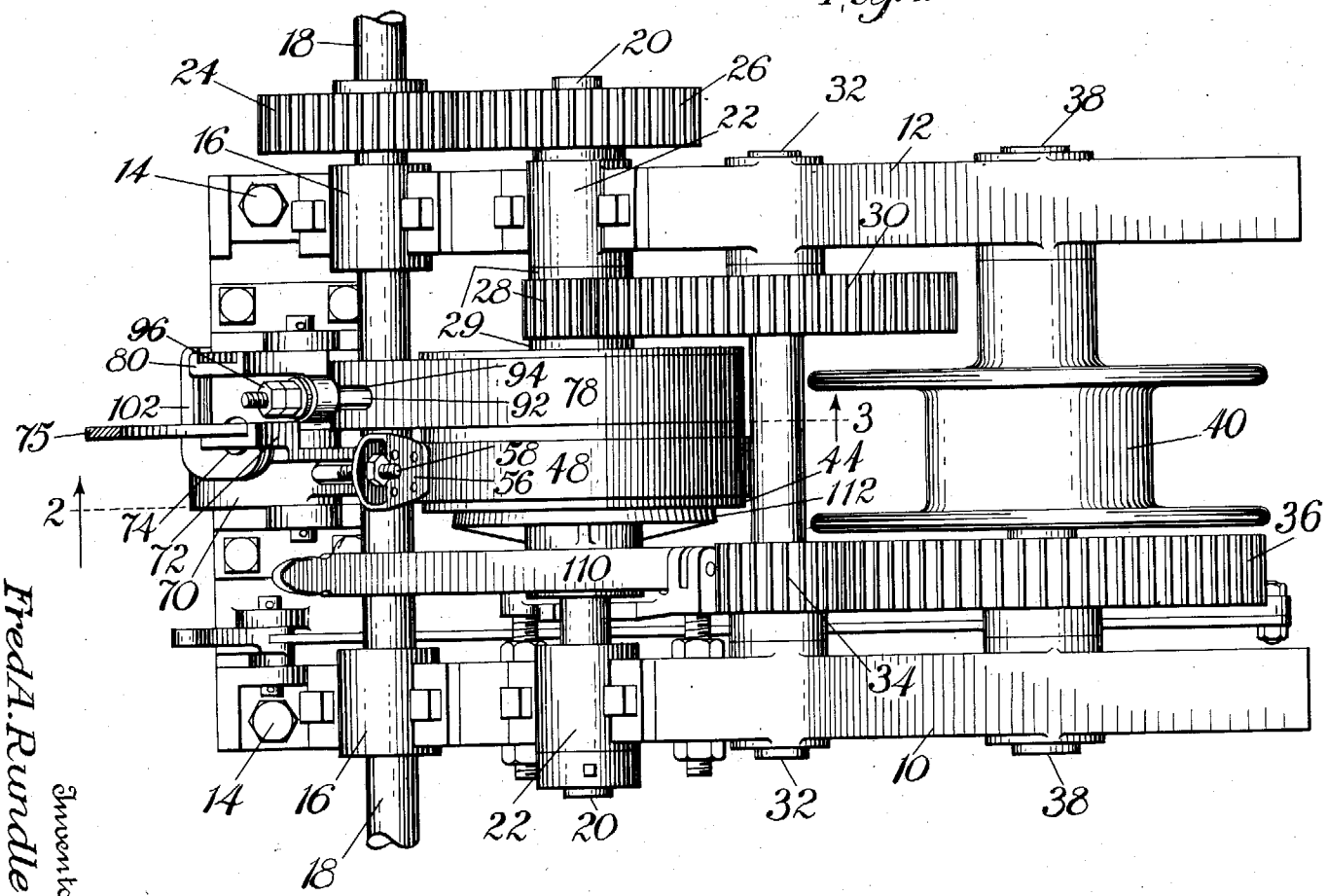
Figure 4:
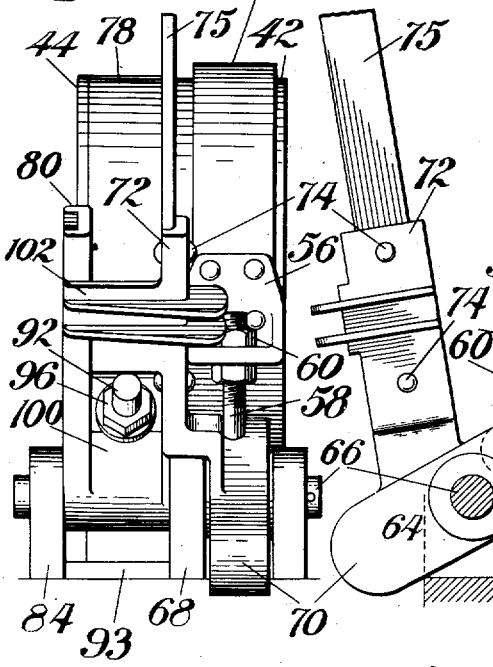
Figure 2:
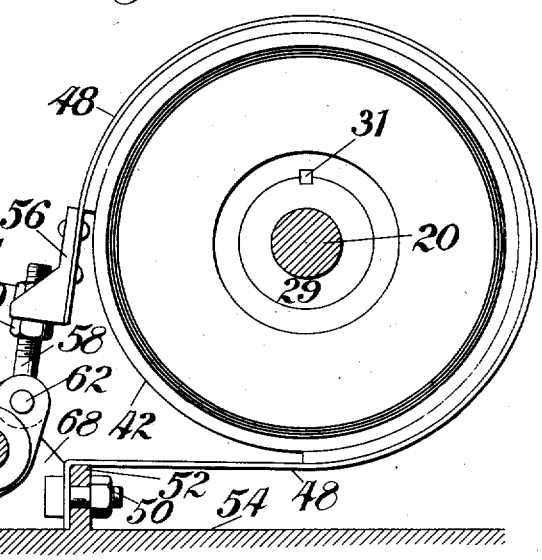
Figure 5:
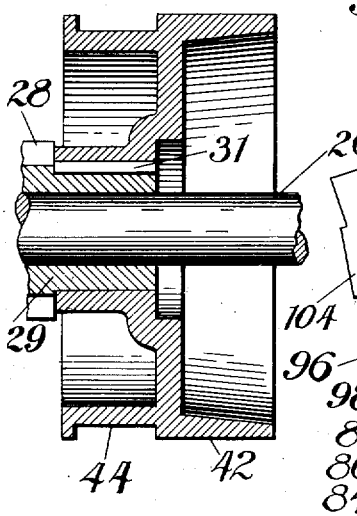
Figure 3:
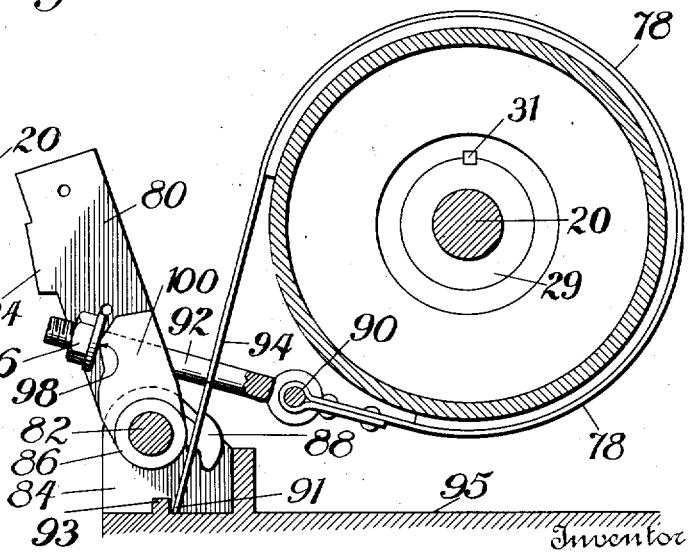

In the drawings, in which similar numerals indicate the same parts throughout the several views; Figure 1 is a plan view of one form of hoisting mechanism having the preferred form of this invention applied thereto. Figure 2 is a sectional detail view of the hand brake showing those parts which lie between the lines 2 and 3 of Figure 1. Figure 3 is a sectional side view taken on the line 3 of Figure 1, showing the automatic brake. Figure 4 is an end view of the two brakes combined looking at them from the left hand end of Figure 1. Figure 5 is a sectional detail view of the brake pulley, showing the details of one form of combined brake and wheel to which this invention is applied.

The particular hoisting mechanism here illustrated in plan view in Figure 1, is provided with side frame members 10 and 12 secured by bolts 14 to any suitable foundation or other base. Journaled in bearings 16 in the side frames is a main line shaft 18 parallel to which is a short shaft 20 carried in bearings 22 in the side frames. These two shafts 18 and 20 are connected together by a pair of suitably proportioned gears 24 and 26 and rotate in unison. On the shaft 20 just inside one bearing of 22 is a pinion 28 meshing with a gear 30 on a shaft 32, also journaled in the side frames. This pinion 28 is rigidly secured to the sleeve 29 to which the brake pulley 42—44 is also rigidly secured by key 31 or other suitable means. The sleeve is of course, loose on the shaft. Near the opposite end of this shaft 32 is a pinion 34 meshing with a gear 36 on another shaft 38, also journaled in the side frames. Rigidly secured to this shaft 38 is a winding drum 40 on which a rope, chain or the like, not shown carrying the load to be lifted is wound or unwound, as the case may be.

The problem solved by this invention is to perfectly control the load suspended from drum 40 when the lifting power is taken off from shaft 18 and this is accomplished by mechanism which will now be described.

Loosely mounted on the shaft 20 between the bearings 22 is the sleeve 29 which carries the two band brake wheels 42 and 44. In the particular case here illustrated, these wheels are integral with each other, but these details are entirely immaterial, the only requirement being that they both be rigidly connected together.

Around the wheel member 42 is placed a flexible brake band 48 of ordinary construction, having one end rigidly attached by any suitable means to a fixed support. In the particular form of the device here illustrated, this is accomplished by use of the bolt 50 passing through a bar or lug 52 rising from a suitable base 54. The opposite end of this brake band is connected by means of the casting 56, the rod 58, and the adjusting nuts 60 to a pivot 62 in one end of a lever 64 pivoted at 66 on a suitable supporting bracket 68. On the opposite end of lever 64 is a counterweight 70 adapted to normally swing the lever 64 in a counterclockwise direction thereby moving the free end 56—48 of the brake band upward, as viewed in Figure 2, and thus releasing the band from frictional contact with the wheel 42. This counterweight engages base 54 as shown in Figure 2 which thus acts as a stop.

Rigidly secured to the lever 64 by any suitable means, such for instance as the casting 72 and the bolts 74, is hand lever 75 adapted to be manipulated by the operator to rotate lever 64 in a clockwise direction against the action of counterweight 70, to thus, at will, tighten up the brake band 48.

From the foregoing it will be seen that when the device of Figure 2 is left to itself, the counterweight 70 and the hand lever 75 will, in the manner described, release brake band 48 from the wheel and that when the operator moves the lever 75 to the right, as viewed in Figure 2, he can, just as gradually as he desires, tighten the brake band 48 upon the wheel and thus accurately control through the agency of this device any load which may be carried from the drum 40.

Similarly, inclosing the wheel 44 is another brake band 78, having its opposite ends connected to a lever 80 pivoted on a suitable bearing 82 carried by a bracket 84. The two bearings or pivots 66 and 82 are concentric with each other or more properly lie in the same line so that when desired, the two levers 75 and 80 can rotate in unison about the same central axis.

Extending from the hub 86 of the lever 80 is a relatively short lever arm 88 to which one end of the brake band 78 is attached, the effective length of the lever being from band 94 to the center of bearing 82. Rigidly connected to the opposite end of the brake band 78 is a transverse bearing pin 90 on which is journaled a rod 92, preferably passing through a slot 94 in the opposite portion of the band 78. The outer end of the rod 92 is connected by a bolt 96 to a knife edge 98 on a lever 100 longer than the lever 88, whose effective length is the distance between the knife edge 98 and the center of 82. The end 91 of band 94 stops against lug 93 on base 95.

It will be noticed that the two lever arms 88 and 100 are of different lengths with reference to the point of attachment of the brake band and yet rotate about the same center 82, with the result that when the hoisting machine rotates the wheel or pulley 44 in a clockwise direction, as viewed in Fig. 3, the band is automatically tightened upon the pulley and the pulley 44 is therefore, stopped and locked, whereas, when the pulley 44 is rotated in a counterclockwise direction, as viewed in Fig. 3, the lever 100 is pulled toward the pulley, thereby releasing the band. The result of this construction is that this device automatically locks the pulley when it tends to rotate in clockwise direction, but can be released by the operator shoving the lever 80 toward the pulley; whereas, on the other hand, when the pulley tends to rotate in a counter clockwise direction, the band 78 will be released. In other words, this device just described serves the purpose of automatically checking the descent of any load upon the drum 40 (said load tending to normally rotate the pulley 44 in a clockwise direction) unless the operator releases lever 80; that is, moves it toward the pulley.

This device just described, which will be hereafter referred to as the automatic brake or braking device, therefore automatically locks the hoisting machine against descent of the load and it might be supposed that by the operator's carefully moving the lever 80 to the right, as viewed in Fig. 3, he could thus gradually release and consequently regulate the descent of the load with sufficiently accurate control, but as a matter of fact, this is not practical, because the arc of movement of the lever 80 between locked position of the band 78 and completely released position thereof is too short to effect accurate control of the load, particularly under different conditions of lubrication, dampness and rust of the various parts as found in working practice. It is for this reason that the more direct and gradually acting hand brake of Figure 2 is supplied adjacent to the automatic brake, and in order that the operator may conveniently and automatically handle the two brakes at once, a projecting lug or finger 102 is rigidly connected to some part of lever 75, as for instance the member 72 and extends over into the path of travel of and engages lever 80 on the bearing plate 104.

The result of the foregoing construction is that, when the parts are assembled in the position shown in the drawings and the tensions of the two bands 48 and 78 are properly adjusted by the nuts 60 and 96, and then the operator moves lever 75 to the right, as viewed in Figure 2, he, in so doing, moves lever 80 to the right and thus releases the automatic brake and simultaneously brings into operation the hand brake of Figure 2 which becomes more and more effective as he increases the pressure upon the lever 75 to the right, as viewed in Figure 2. When, on the other hand, the operator releases lever 75 the counter weight 70 rotates lever 75 to the left and thus completely releases the hand brake band 48 and also releases the automatic brake from the control of this lever 75, with the result that the automatic brake is left to operate just as though the hand brake device were not present; that is to say, automatically locking the wheel 44 whenever the load tends to rotate that wheel in a clockwise direction and automatically releasing itself and consequently the wheel 44 whenever power is applied to the mechanism to rotate the shaft 20 in a counter clockwise direction, i. e., when raising the load by mechanical power takes place.

While it does not enter into this invention it may be explained that shafts 18 and 20 are continuously rotated by power and when lifting of the load on drum 40 is to take place, the hand lever 110 is manipulated to move clutch 112 into engagement with the end of pulley 44. Lever 110 is of course moved in the opposite direction to throw off the power and at this time the automatic brake takes hold as described.

Having thus described my invention, what I claim as new and desire to secure by Letters Patent is:

1. In a device of the class described, the combination of a shaft, a pair of rigidly connected pulleys on said shaft, a brake band on one of said pulleys, means for automatically operating said brake to prevent rotation of said pulley in a given direction, a second brake band on the other of said pulleys, a lever for applying said last mentioned brake band, and means operated by the said lever for releasing the automatically controlled brake band.

2. In a device of the class described, the combination of a shaft, a pair of rigidly connected pulleys on said shaft, a brake band on one of said pulleys, means for automatically operating said brake band to prevent rotation of said pulley in a given direction, and permitting a free rotation of said pulley in the opposite direction, a second brake band on the other of said pulleys, a hand lever for applying said brake band, and means carried by said lever for releasing the automatically controlled brake band.

In witness whereof, I have hereunto subscribed my name in the presence of two witnesses.

FRED A. RUNDLE.

Witnesses:
EVA L. RUNDLE,
R. B. KIRKE.